US012552242B2

(12) United States Patent
Pfingsten et al.

(10) Patent No.: US 12,552,242 B2
(45) Date of Patent: Feb. 17, 2026

(54) VEHICLE FRONT END ASSEMBLY

(71) Applicant: NISSAN NORTH AMERICA, INC., Franklin, TN (US)

(72) Inventors: Stephen Pfingsten, Royal Oak, MI (US); David Coakley, Macomb, MI (US); Tony Tognetti, Brownstown Township, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 694 days.

(21) Appl. No.: 17/965,696

(22) Filed: Oct. 13, 2022

(65) Prior Publication Data

US 2024/0123815 A1   Apr. 18, 2024

(51) Int. Cl.
*B60K 11/08* (2006.01)
*B62D 25/08* (2006.01)

(52) U.S. Cl.
CPC ............ *B60K 11/08* (2013.01); *B62D 25/084* (2013.01)

(58) Field of Classification Search
CPC .............................. B60K 11/08; B62D 25/084
USPC ........................................................ 180/68.1
See application file for complete search history.

(56) References Cited

U.S. PATENT DOCUMENTS

| | | | |
|---|---|---|---|
| 6,681,876 B1* | 1/2004 | Haneda ................ | B62D 25/084 180/68.4 |
| 7,914,071 B2* | 3/2011 | Saitou .................. | B62D 25/084 70/240 |
| 8,646,554 B2* | 2/2014 | Takahashi ............ | B62D 25/084 165/67 |
| 10,093,260 B2* | 10/2018 | Shen ..................... | B62D 25/12 |
| 10,696,254 B2* | 6/2020 | Nakamoto ............. | B60R 19/34 |
| 10,894,565 B2* | 1/2021 | Nakamoto ............. | E05B 83/24 |
| 2002/0070062 A1* | 6/2002 | Joutaki ................ | B62D 29/004 180/68.4 |
| 2004/0011513 A1* | 1/2004 | Haneda ................ | B62D 29/004 165/148 |
| 2011/0011661 A1* | 1/2011 | Takahashi ............ | B62D 25/084 180/68.4 |
| 2018/0222418 A1* | 8/2018 | Shen ..................... | E05B 83/24 |

(Continued)

FOREIGN PATENT DOCUMENTS

| | | |
|---|---|---|
| KR | 20050114027 A | 12/2005 |
| KR | 100643999 B1 | 11/2006 |
| KR | 101273896 B1 | 6/2013 |

(Continued)

*Primary Examiner* — James A Shriver, II
*Assistant Examiner* — Hilary L Johns
(74) *Attorney, Agent, or Firm* — Spencer Fane, LLP (57) ABSTRACT

The vehicle front end assembly includes a grille, a front end module, an upper grille panel and a hood lock assembly. The front end module has a radiator unit positioned rearwardly with respect to the grille. The front end module further has a support frame that is positioned rearwardly with respect to the radiator unit. The upper grille panel has a hood lock access area. The hood lock assembly is positioned in the hood lock access area of the upper grille panel. The hood lock assembly has a hood lock that is movable with respect to the upper grille panel. The hood lock assembly further has an airflow barrier that is fixedly supported with respect to the hood lock assembly. The airflow barrier has a front wall that is positioned forward of the hood lock to deflect air flow received through the grille.

17 Claims, 10 Drawing Sheets

(56) References Cited

U.S. PATENT DOCUMENTS

2019/0143920 A1* 5/2019 Nakamoto ............. B60K 11/04
                                                                               296/193.09

FOREIGN PATENT DOCUMENTS

| KR | 101297559 B1 | 8/2013 |
| KR | 101471363 B1 | 12/2014 |

* cited by examiner

VEHICLE FRONT END ASSEMBLY

BACKGROUND

Technical Field

The present disclosure generally relates to a vehicle front end assembly. More specifically, the present disclosure relates to a vehicle front end assembly having a hood lock assembly.

Background Information

Front end module heat exchangers perform most efficiently when large quantities of air can be used to remove heat from the fluid inside the heat exchangers. Front end modules heat exchangers include radiators, condensers, transmission oil coolers, etc. The radiator fluid (coolant), the condenser fluid (refrigerant), and transmission oil cooler fluid (transmission oil) become hot during vehicle operation. Air entering the vehicle grill can cool the heat exchanges and the fluid inside the heat exchangers. Airflow to the radiator can be improved by adding seals or airflow barriers to channel air to the radiator. These airflow barriers prevent air from bypassing the radiator and maximize radiator cooling efficiency.

SUMMARY

In view of the state of the known technology, one aspect of the present disclosure is to provide a vehicle front end assembly comprising a grille, a front end module, an upper grille panel and a hood lock assembly. The front end module has a radiator unit positioned rearwardly with respect to the grille. The front end module further has a support frame that is positioned rearwardly with respect to the radiator unit. The upper grille panel extends rearwardly with respect to the grille and overlies the front end module. The upper grille panel has a hood lock access area. The hood lock assembly is positioned in the hood lock access area of the upper grille panel. The hood lock assembly has a hood lock that is movable with respect to the upper grille panel. The hood lock assembly further has an airflow barrier that is fixedly supported with respect to the hood lock assembly. The airflow barrier has a front wall that is positioned forward of the hood lock to deflect air flow received through the grille.

In view of the state of the known technology, another aspect of the present disclosure is to provide a hood lock assembly for a vehicle. The hood lock assembly comprises a hood lock and a hood lock housing. The hood lock is movable with respect to the hood lock housing. The hood lock housing has a receptacle defined by a front wall and a pair of sidewalls. The hood lock is movably disposed within the receptacle.

In view of the state of the known technology, another aspect of the present disclosure is to provide a vehicle front end assembly comprising a grille, a front end module, an upper grille panel, a hood lock assembly and a bell crank assembly. The front end module has a radiator unit positioned rearwardly with respect to the grille. The front end module further has a support frame that is positioned rearwardly with respect to the radiator unit. The upper grille panel extends rearwardly with respect to the grille and overlies the front end module. The upper grille panel has a hood lock access area and a bell crank access area. The hood lock assembly is positioned in the hood lock access area of the upper grille panel. The hood lock assembly has a hood lock that is movable with respect to the upper grille panel. The hood lock assembly further has a first airflow barrier that is fixedly supported with respect to the hood lock assembly. The bell crank assembly is positioned in the bell crank access area of the upper grille panel. The bell crank assembly has a bell crank that is movable with respect to the upper grille panel. The bell crank assembly further has a second airflow barrier that is fixedly supported with respect to the bell crank assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
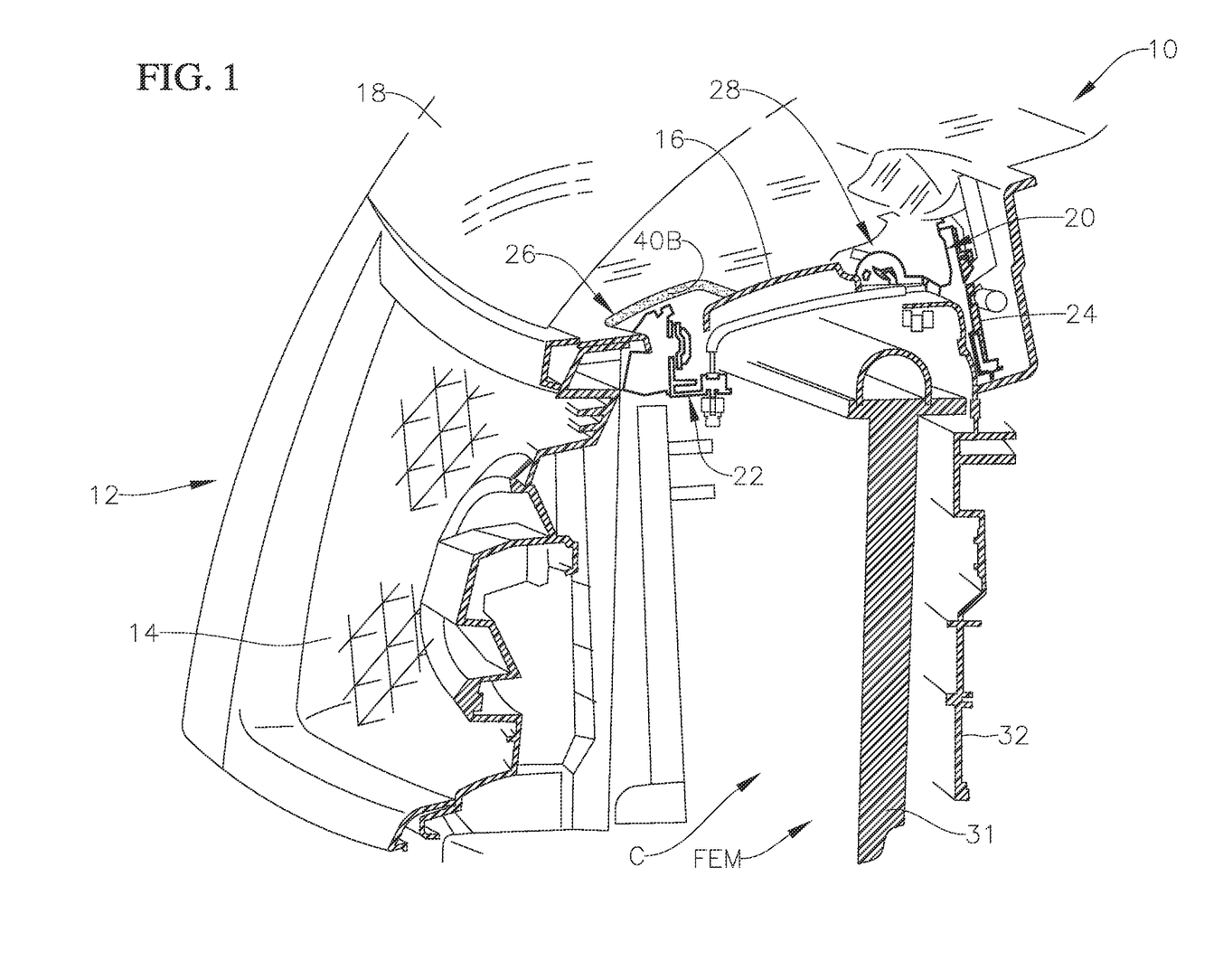
FIG. 1 is a cross-sectional perspective view of a portion of a vehicle front end assembly in accordance with an illustrated embodiment.

Referring initially to FIG. 1, a portion of a vehicle 10 is illustrated as being equipped with a vehicle front end assembly 12. The vehicle front end assembly 12 comprises a grille 14, a front end module FEM and a upper grille panel 16. The vehicle front end assembly 12 further comprises a hood 18 that is openable and closeable to overlie the upper grille panel 16. In the illustrated embodiment, the vehicle front end assembly 12 further comprises a hood lock assembly. The vehicle front end assembly 12 further comprises a bell crank assembly 22, as will be further described below.

FEMs can include one or more heat exchanger units for heating and/or cooling various components of the vehicle 10. As shown, the front end module FEM is fixed to the body structure of a vehicle front end and is located in front of the vehicle's engine compartment C. The front end module (FEM) is primarily provided to the vehicle 10 for intaking air from the environment and cooling the fluid in the heat exchangers.

The vehicle grille 14 allows air to enter through the engine compartment C towards the front end module FEM during vehicle use. The hood 18 is hingedly coupled to the vehicle body and overlies the engine compartment C of the vehicle 10. As shown in FIG. 1, the hood lock assembly includes a hood lock 24 or latch that is concealed underneath the hood 18. In particular, the hood lock 24 is retained in the upper grille panel 16.

The bell crank assembly 22 is also retained to the upper grille panel 16 and the hood 18 overlies the upper grille panel 16 to overly the bell crank assembly 22 and the hood lock 24 when the hood 18 is closed. The hood 18 can be constructed from steel, aluminum, carbon fiber, fiberglass, and/or dry carbon.

The upper grille panel 16 extends rearwardly with respect to the grille 14. The upper grille panel 16 is typically a plastic cover or guard that protects the components of the FEM when the hood 18 is opened. The upper grille panel 16 is typically fixed to the grille 14 as a separate or integral piece with the grille 14. The upper grille panel 16 includes a bell crank access area 26 to allow the bell crank 22A to engage the hood 18 and for accessing the bell crank assembly 22 for maintenance and use when the user opens the hood 18. The bell crank assembly 22 22 is positioned in the bell crank access area 26 of the upper grille panel 16. The bell crank 22A is movable with respect to the upper grille panel 16, as will be further described below.

The upper grille panel 16 further includes a hood lock access area 28 for accessing the hood lock 24 for maintenance and use when the user opens the hood 18. The bell crank access area 26 and the hood lock access area 28 are openings in the upper grille panel 16 to allow the hood 18 to engage the bell crank 22A and the hood lock 24, respectively. The bell crank assembly 22 and the hood lock 24 are fixedly attached to the components of the FEM, as will be further described below.

The hood lock assembly 20 is positioned in the hood lock access area 28 of the upper grille panel 16. The hood lock 24 is movable with respect to the upper grille panel 16. In the illustrated embodiment, the hood lock assembly 20 further includes a first airflow barrier 30 that is fixedly supported with respect to the hood lock assembly 20. The first airflow barrier 30 has a front wall 30A that is positioned forward of the hood lock 24 to deflect air flow received through the grille 14.

The vehicle 10 preferably includes one or more sealed pathways connecting the grille 14 and the FEM (e.g., a radiator unit 31) for air to flow rearward therethrough. Preferably, the upper grille panel 16 partially forms the pathway by channeling air to flow from the grille 14 rearwardly therethrough to the components of the FEM, particularly the radiator unit 31. As best seen in FIG. 1, the upper grille panel 16 overlies the front end module FEM. The upper grille panel 16 can be made by injection mold with a ridged main body and an optional flexible upper seal.

As shown in FIG. 1, a portion of the front end module FEM that can be implemented with the vehicle 10 of FIG. 1 is illustrated. The front end module FEM comprises one or more front end module FEM structures that can include, for example, a fan (not shown), a radiator unit 31 and a heat exchanger unit (e.g., transmission cooler, condenser unit). The fan, the radiator unit 31, the heat exchanger units and the attachment structures can all be considered front end module FEM structures of the illustrated embodiment. The radiator unit 31 is positioned rearwardly with respect to the grille 14. The front end module FEM further includes a support frame 32 that is positioned rearwardly with respect to the radiator unit 31. The support frame 32 is an attachment structure of the FEM. The support frame 32 can support the radiator unit 31 and the fan and other structures of the FEM.

As shown, the hood lock 24 is supported to the front end module FEM at a position that is forward of the support frame 32. In particular, the hood lock 24 is supported to the support frame 32, and the first airflow barrier 30 is also supported to the support frame 32. The hood lock 28 can be supported to the support frame 32 by fasteners such as bolts, screws, hooks or by snap fit. Similarly, the first airflow barrier 30 is also supported to the support frame 32 by fasteners such as bolts, screws, hooks or by snap fit. In the illustrated embodiment, the hood lock and the first airflow barrier 30 can each by directly supported to the support frame 32. Alternatively, the hood lock and the first airflow barrier 30 can each be supported to the support frame via other attachment structures such as brackets, etc.

The hood lock 28 is provided to maintain the hood 18 in the closed state. The bell crank 22A is operable to release the hood lock 24 to release the hood 18 into the opened state. The bell crank 22A and the hood lock 24 may be exposed to dust and dirt.

Figure 3:
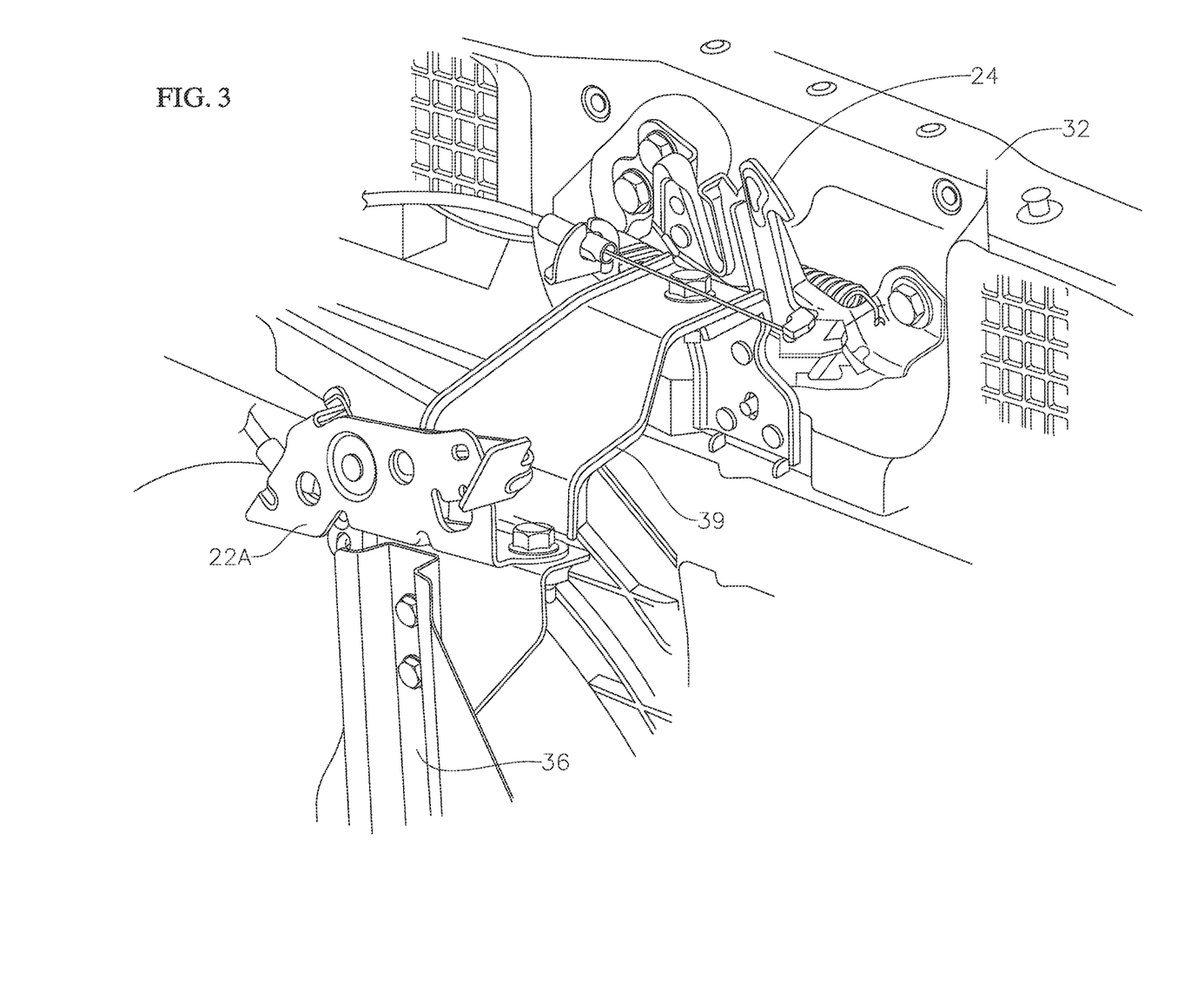
FIG. 3 is a perspective view of the vehicle front end assembly similar to FIG. 2 but with an upper grille panel removed.
Figure 4:
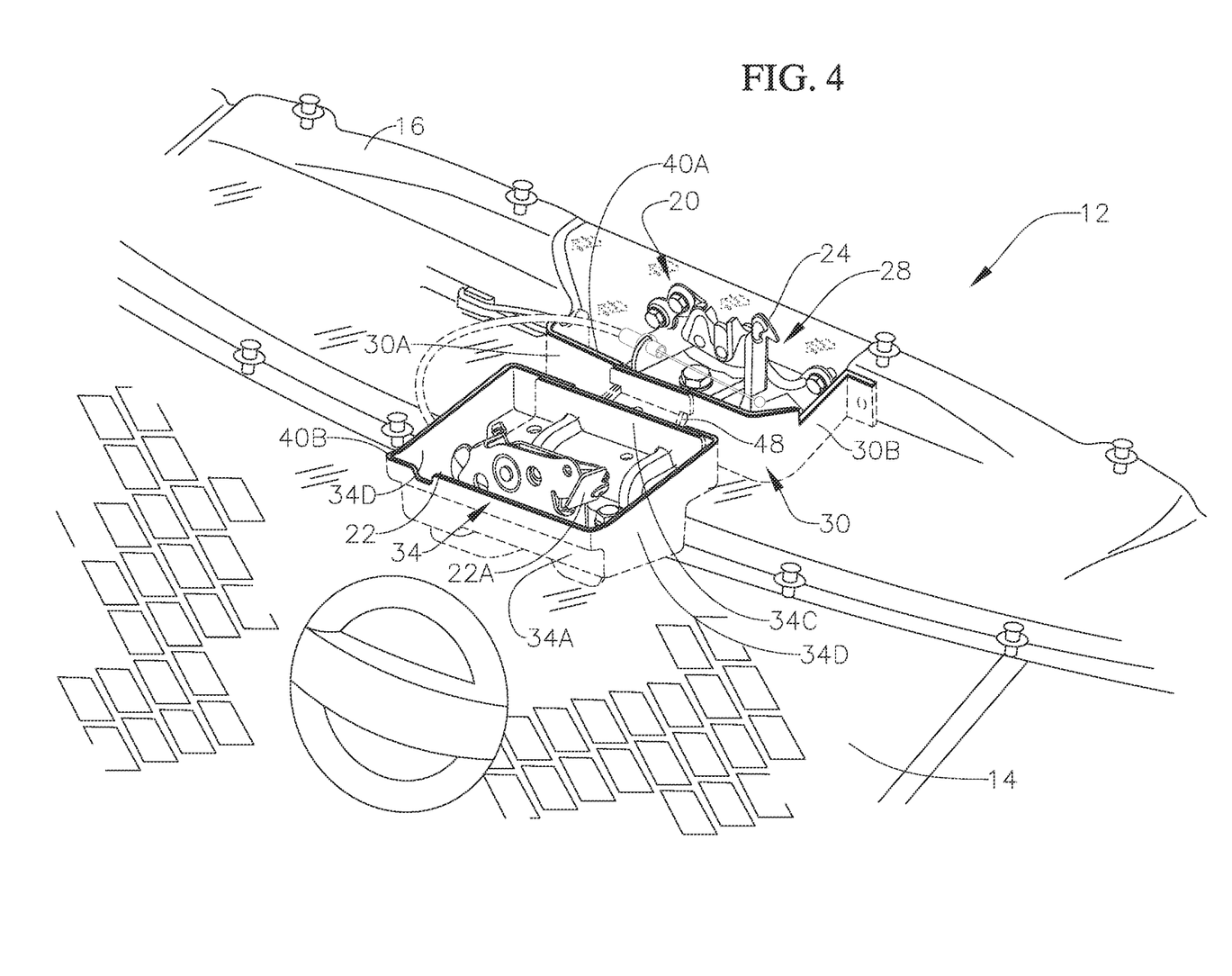
FIG. 4 is a front perspective view of the vehicle front end assembly similar to FIG. 2 but being equipped with a hood lock assembly and a bell crank assembly in accordance with an illustrated embodiment.
Figure 5:
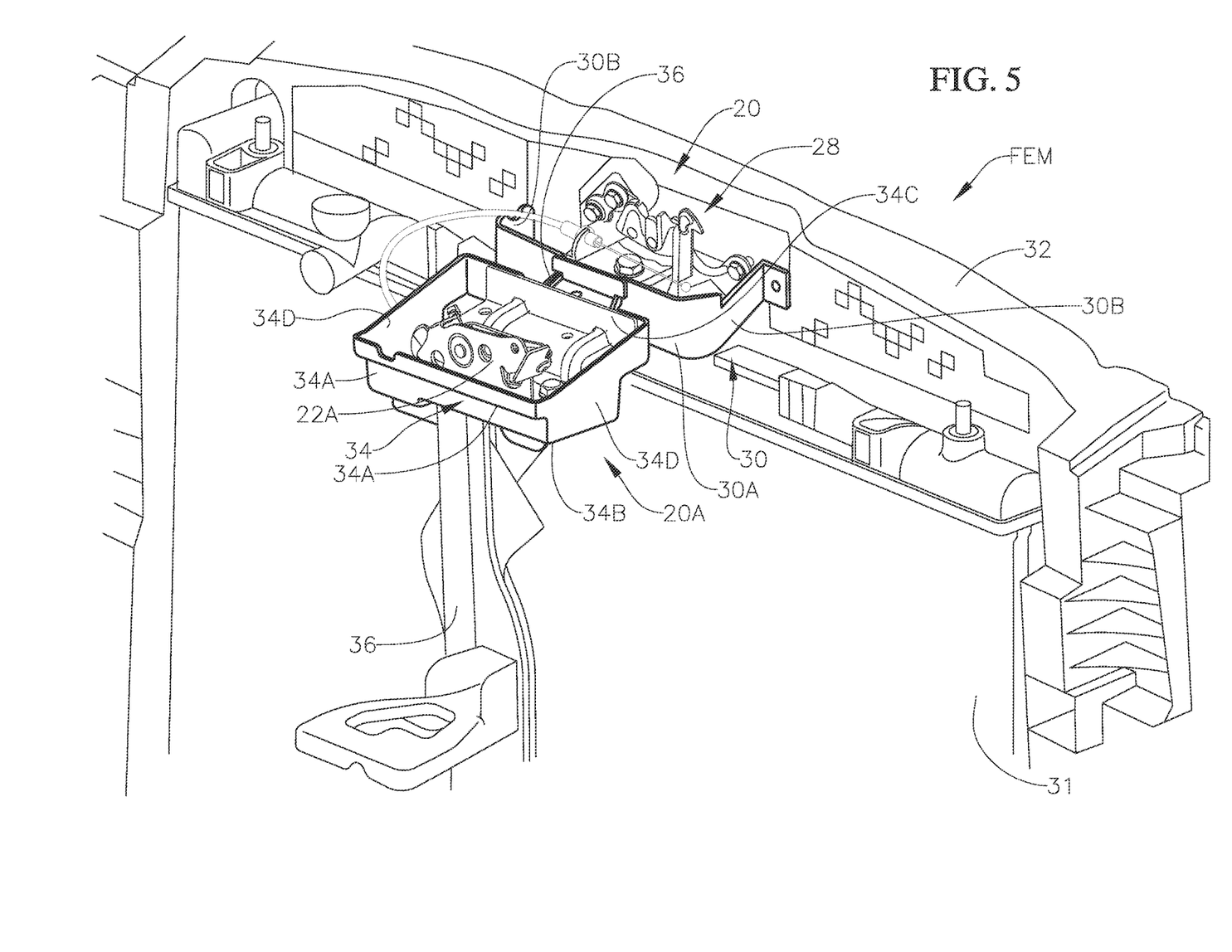
FIG. 5 is a front perspective view of the vehicle front end assembly with the upper grille panel removed to show the hood lock assembly and the bell crank assembly.

Referring to FIGS. 3 to 5, the radiator unit 31 cools the vehicle's 10 engine by receiving and cooling hot liquid from the engine. The radiator unit 31 has a radiator core and a pair of radiator tanks disposed on opposite lateral sides of the radiator core. Therefore, the radiator unit 31 includes a radiator tank that is typically made of plastic, or alternatively made of metal. The radiator core is comprised of many small tubes (not shown) that can be equipped with many radiator fins to dissipate heat rapidly. The radiator fins are made of metal, such as brazed aluminum. Fluid flows between the interior of the radiator tanks and the interior of the radiator core where the fluid is cooled. The bell crank 11A is supported to the front end module FEM at a position that is forward of the radiator unit 31. The hood lock 24 is supported to the front end module FEM rearward of the bell crank and rearward of the radiator core.

As seen in FIGS. 3 to 6, the front end module FEM can further include any mounting or attachment frames (e.g., a condenser attachment bracket shown) for supporting the front end module FEM structures together. As seen in FIG. 3, the front end module FEM can additionally include air guides for directing air received from the vehicle front end rearward through the front end module FEM structures.

The front end module FEM is part of a temperature control system of the vehicle 10 for maintaining a desired temperature of the vehicle's 10 interior components and passenger cabin, such as to prevent the engine from overheating. For example, the condenser unit is part of the heating, ventilation and air conditioning (HVAC) system of the vehicle 10. The condenser unit intakes warm or hot air out of passenger compartment where it is cooled by the refrigerant of the condenser unit. The cooler air is then recirculating to the passenger compartment through the HVAC.

Due to air traveling through the grille 14 and upper grille panel 16, the bell crank assembly 22 and the hood lock assembly can collect dust and dirt over time. Therefore, the vehicle 10 is provided with the hood lock assembly 20 having the first airflow barrier 30. The vehicle 10 is preferably further provided with the bell crank assembly 22 having a second airflow barrier 34 in accordance with an illustrated embodiment. In the illustrated embodiment, the first airflow barrier 30 can be considered a housing or a partial housing for the hood lock 24. Similarly, the second airflow barrier 34 can be considered a housing or a partial housing for the bell crank 22A.

The bell crank assembly 22 is positioned in the bell crank access area 26 of the upper grille panel 16. The bell crank 22A is a linkage that serves as a hood 18 release lever or a hood 18 latch release for the vehicle 10. The bell crank 22A includes a movable bell crank 22A that is a steering arm. However, it will be apparent to those skilled in the vehicle field from this disclosure that the bell crank 22A can be attached other structures of the FEM. Alternatively, it will also be apparent to those skilled in the vehicle field from this disclosure that the bell crank 22A can be directly fixed to the upper grille panel 16 such as by snap-fitting or using fasteners.

As best seen in FIG. 3, the bell crank 22A is fixed to a mounting bracket 36 that is an attachment structure of the FEM. Therefore, the bell crank 22A is supported to the structures of the FEM and the upper grille panel 16 via the mounting bracket. However, it will be apparent to those skilled in the vehicle field from this disclosure that the bell crank 22A can be attached other structures of the FEM.

Figure 2:
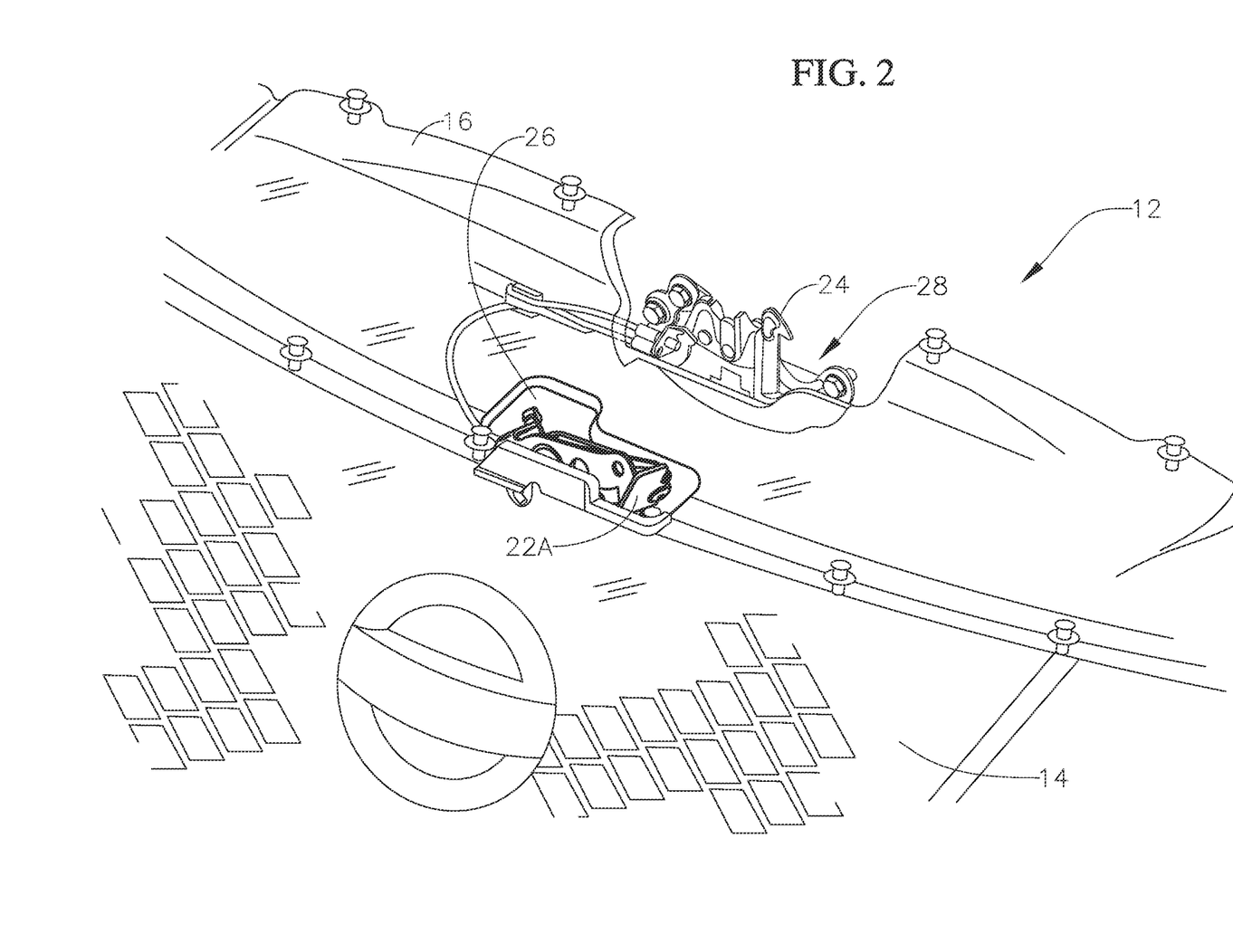
FIG. 2 is a front perspective view of the vehicle front end assembly of FIG. 1.

Preferably, the bell crank assembly 22 and the hood lock assembly are positioned slightly underneath the upper grille panel 16 and accessible via the bell crank access area 26, as shown in FIGS. 1 and 2. The bell crank 22A is movable with respect to the bell crank access area 26. As shown, the bell crank 22A is supported to the front end module FEM at a position that is forward of the radiator unit 31.

As best seen in FIGS. 1 to 3, the first airflow barrier 30 preferably further includes a first elastic seal 40A. The first elastic seal 40A is disposed around a periphery of the hood lock access area 26. As shown in FIG. 1, the first elastic seal 40 is positioned between the upper grille panel 16 and the first airflow barrier 30. The second airflow barrier 34 also includes a second elastic seal 40B that is disposed around a periphery of the bell crank access area 26. As shown in FIG. 1, the elastic seals 40A and 40B are positioned between the upper grille panel 16 and the first airflow barrier 30 and the second airflow barrier 34, respectively. The foam can be made of synthetic rubber, such as EPDM synthetic rubber mixture designed for a variety of high performance gasketing and insulation applications. The elastic seals 40A and 40B prevent air from flowing between the upper grille panel 16 and the first airflow barrier 30 and the second airflow barrier 34, respectively.

Therefore, in the illustrated embodiment, the first airflow barrier 30 can be considered a hood lock housing 42 and the hood lock 24 sits within the hood lock housing 42. The hood lock is movable with respect to the hood lock housing 42. The hood lock housing 42 has a receptacle defined by the front wall and a pair of sidewalls. The hood lock is movably disposed within the receptacle. The hood lock housing 42 has a receptacle defined by the front wall. The hood lock 24 is movably disposed within the receptacle.

The hood lock housing 42 is preferably made of a rigid member, such as plastic polypropylene. As shown in FIG. 4, the hood lock assembly 20 having the hood lock 24 and the hood lock housing 42 are sized and dimensioned to be fitted to the hood lock access area 30 of the upper grille panel 16. The bell crank 22A is exposed via the top of the bell crank housing 50 so that the driver can access the bell crank 22A when the hood 18 is open.

As best seen in FIGS. 6 to 10, the first airflow barrier 30 further includes a pair of sidewalls 30B extending from the front wall 30A rearwardly. The sidewalls 30B extend from the lateral sides of the front wall 30A. In addition, the sidewalls 30B are preferably integrally formed with the front wall 30A. At least one of the sidewalls 30B includes an attachment flange 30C. The attachment flange 30C includes at least one receiving openings for receiving a fastener for fastening the hood lock assembly 20 to the support frame 32.

Figure 7:
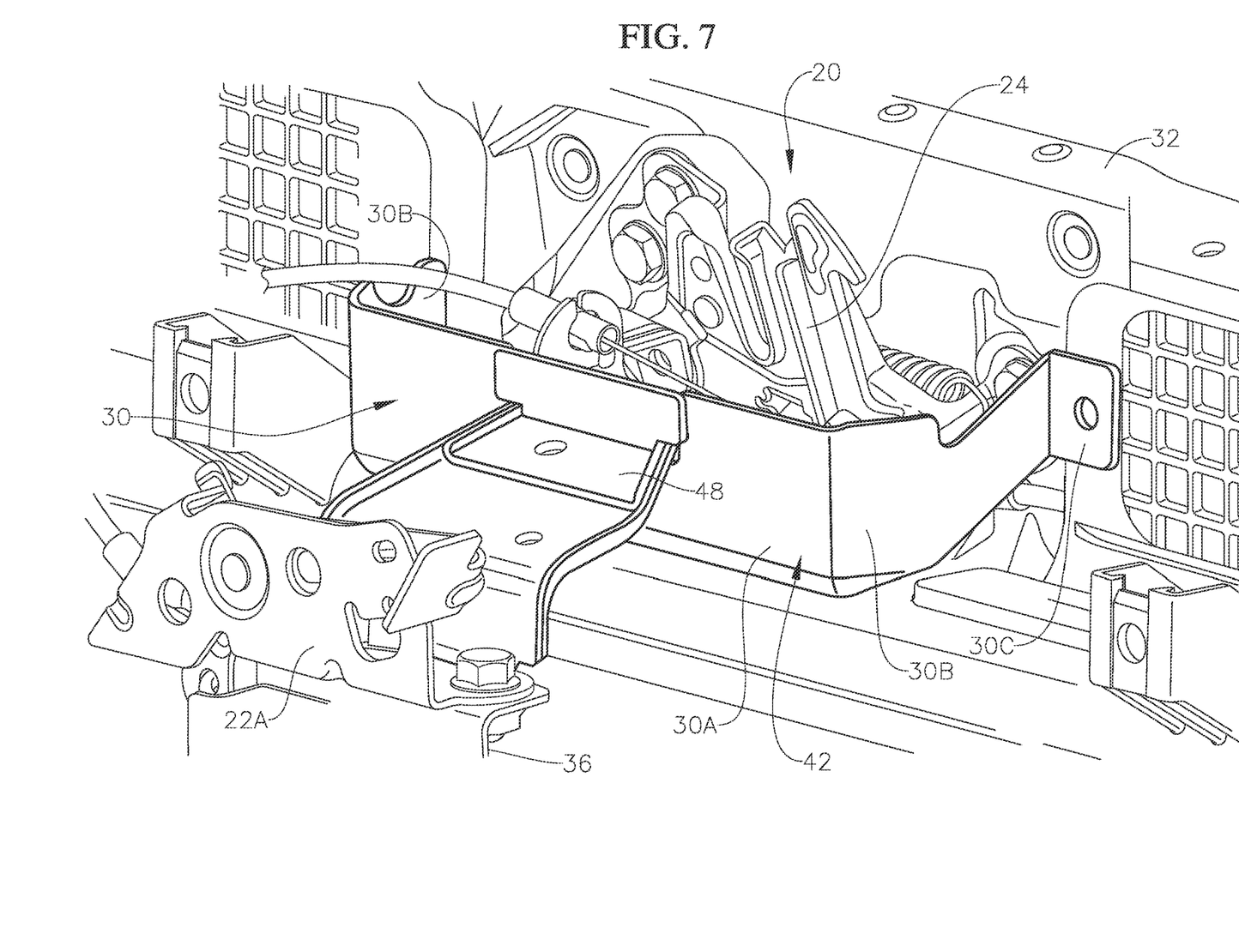
FIG. 7 an enlarged front perspective view of the hood lock assembly.

The first airflow barrier 30 can have a lower wall (not shown) connecting the lower end of the two sidewalls 30B to further improve the flow of air to the radiator. In FIG. 7, the radiator unit 31 fills the gap between the lower end of the two sidewalls 30B. Therefore, the first airflow barrier 30 does not include a lower or a bottom wall because the radiator unit 41 acts as an airflow barrier from below.

As seen in FIGS. 3 and 5, mounting bracket 36 includes an upper horizontal portion, a vertical portion and a lower horizontal portion (not shown). The rearward end of the upper horizontal portion attaches to the support frame 32. The forward end of the upper horizontal portion connects to the upper end of the vertical portion. The lower end of the vertical portion connects to the forward end of the lower horizontal portion. And, the rearward end of the lower horizontal portion attaches to the lower end of the support frame 32. The bell crank 22A is mounted to the forward end of the upper horizontal portion. The mounting bracket 36 is preferably made of stamped sheet metal although it could be made of any ridged material.

Figure 8:
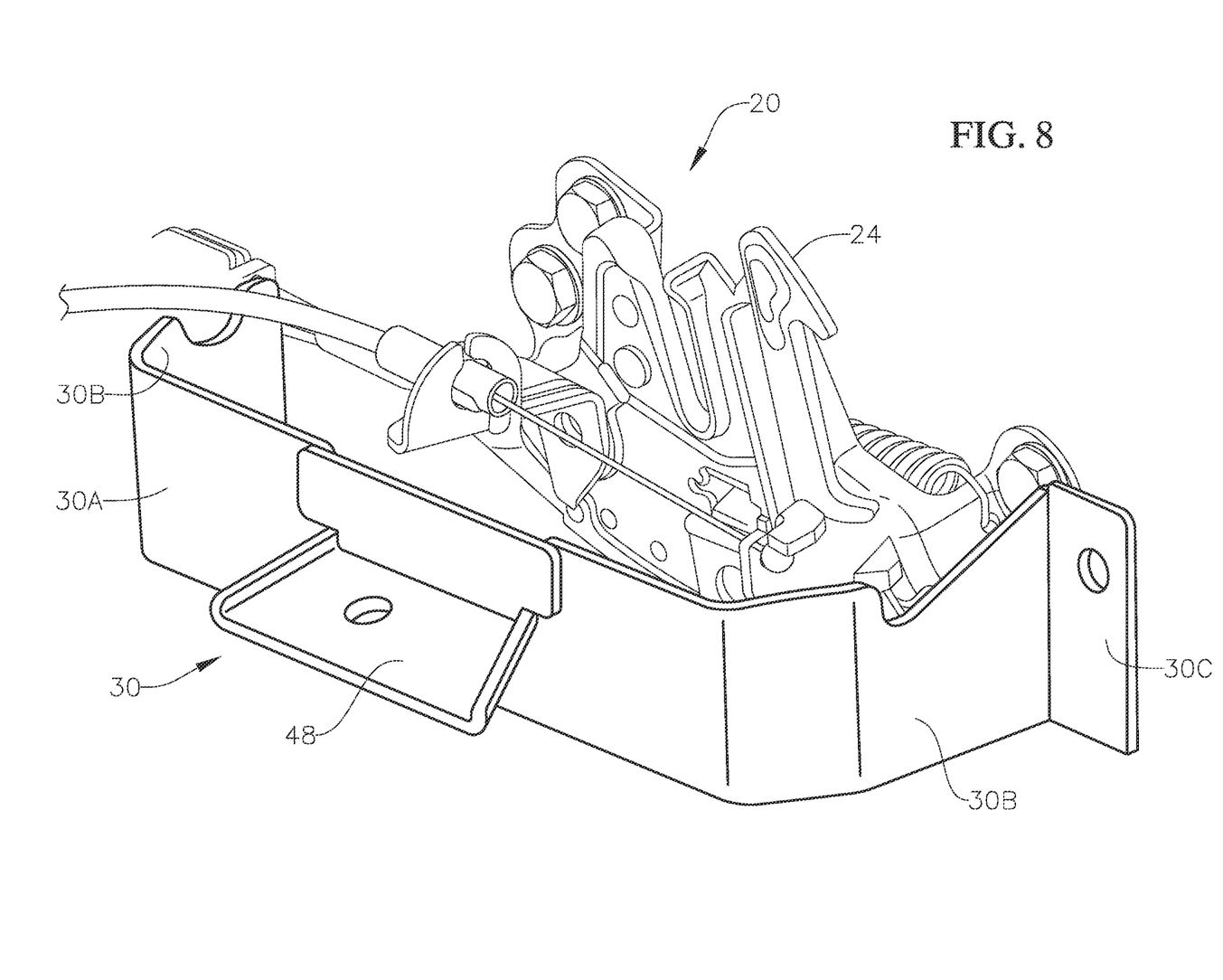
FIG. 8 is a front perspective view of the hood lock assembly.
Figure 9:
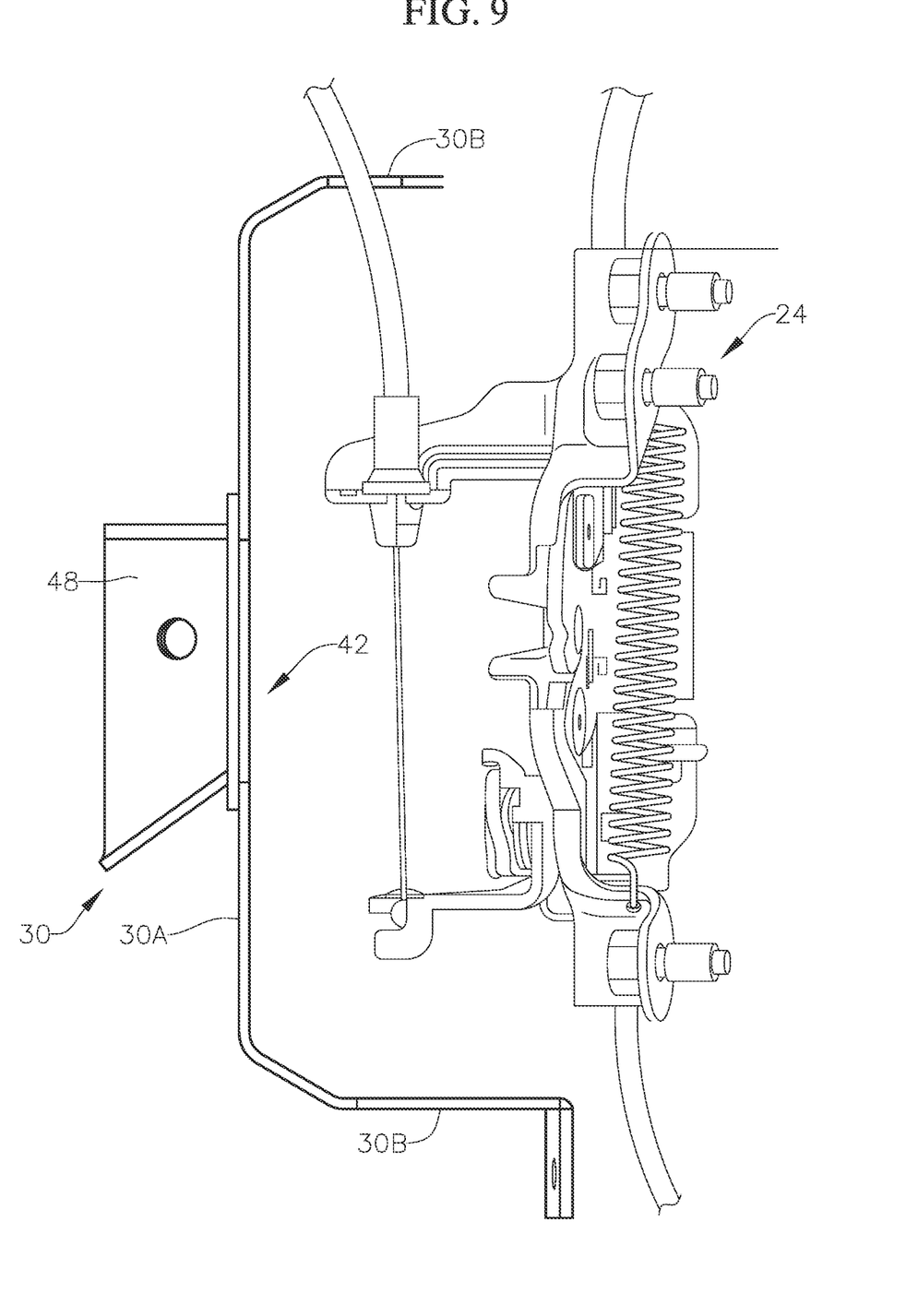
FIG. 9 is an exploded perspective view of the hood lock assembly.
Figure 10:
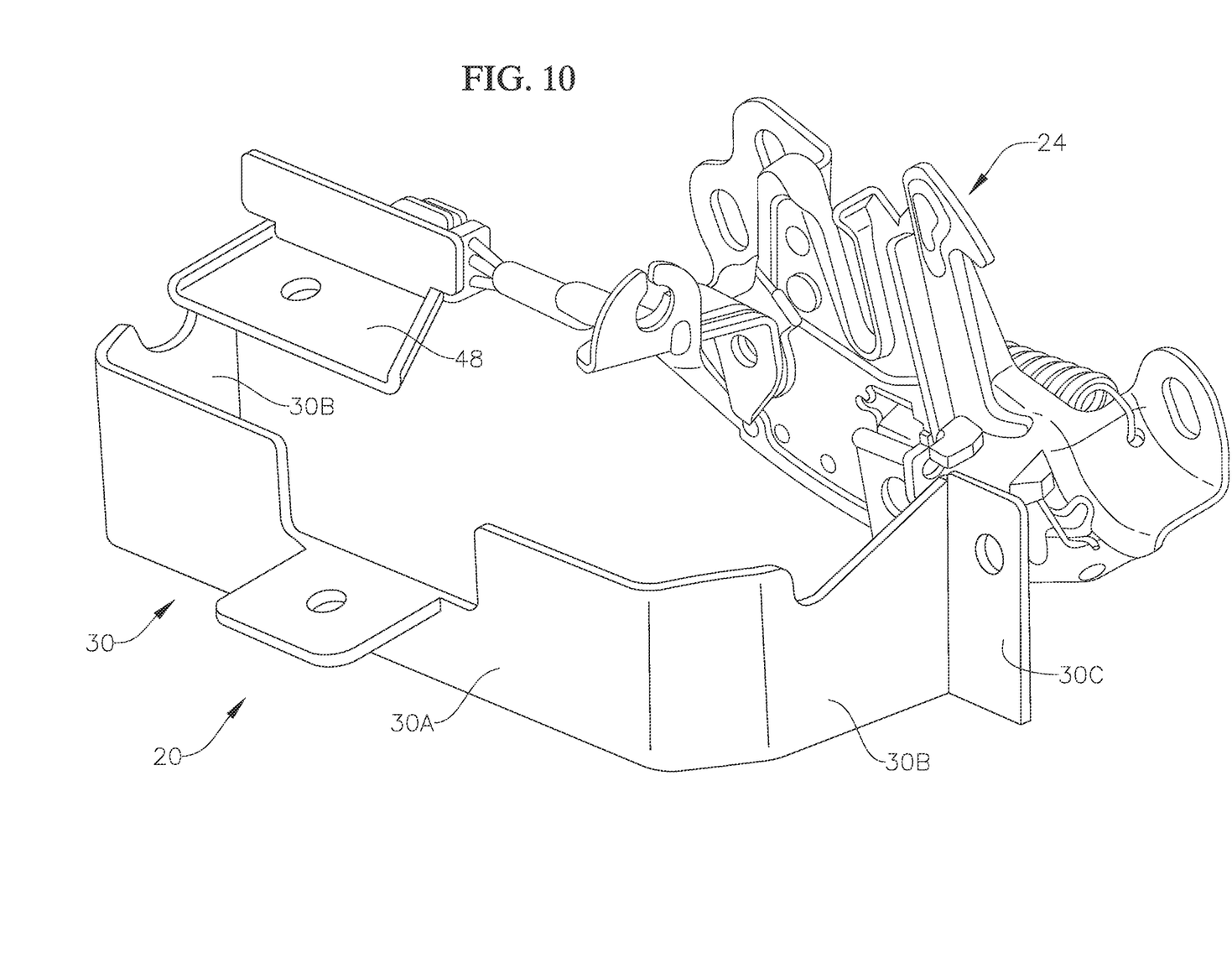
FIG. 10 is a top plane view of the hood lock assembly.

As seen in FIG. 7, the first airflow barrier 30 further includes a gap barrier 48 that extends forward from the front wall of the hood lock assembly 20 towards the bell crank 22A. The gap barrier 48 fills a gap in front wall 30A. The gap in front wall 30A allows mounting bracket 36 to extend through a gap of the front wall 30A (best seen in FIG. 10). As best seen in FIGS. 7 to 10, the gap barrier 48 has an opening that attaches to the upper surface of the upper horizontal portion of mounting bracket 36. As best seen in FIG. 8, the first airflow barrier 30 has a forward extending flange with an opening that attaches to the lower surface of the upper horizontal portion of mounting bracket 36. Therefore, the bell crank assembly 22 and the hood lock assembly 20 are supported to each other via one or more mounting brackets. Therefore, the vehicle 10 can be provided having both the hood lock assembly 20 and the bell crank assembly 22 as a unit. In the illustrated embodiment, the gap barrier 48 can be considered part of the hood lock assembly 20, or as an addition to the hood lock assembly 20. The first airflow barrier 30, second airflow barrier 34, and the gap barrier 48 are preferably made of polypropylene although they could be made of any rigid material.

Figure 6:
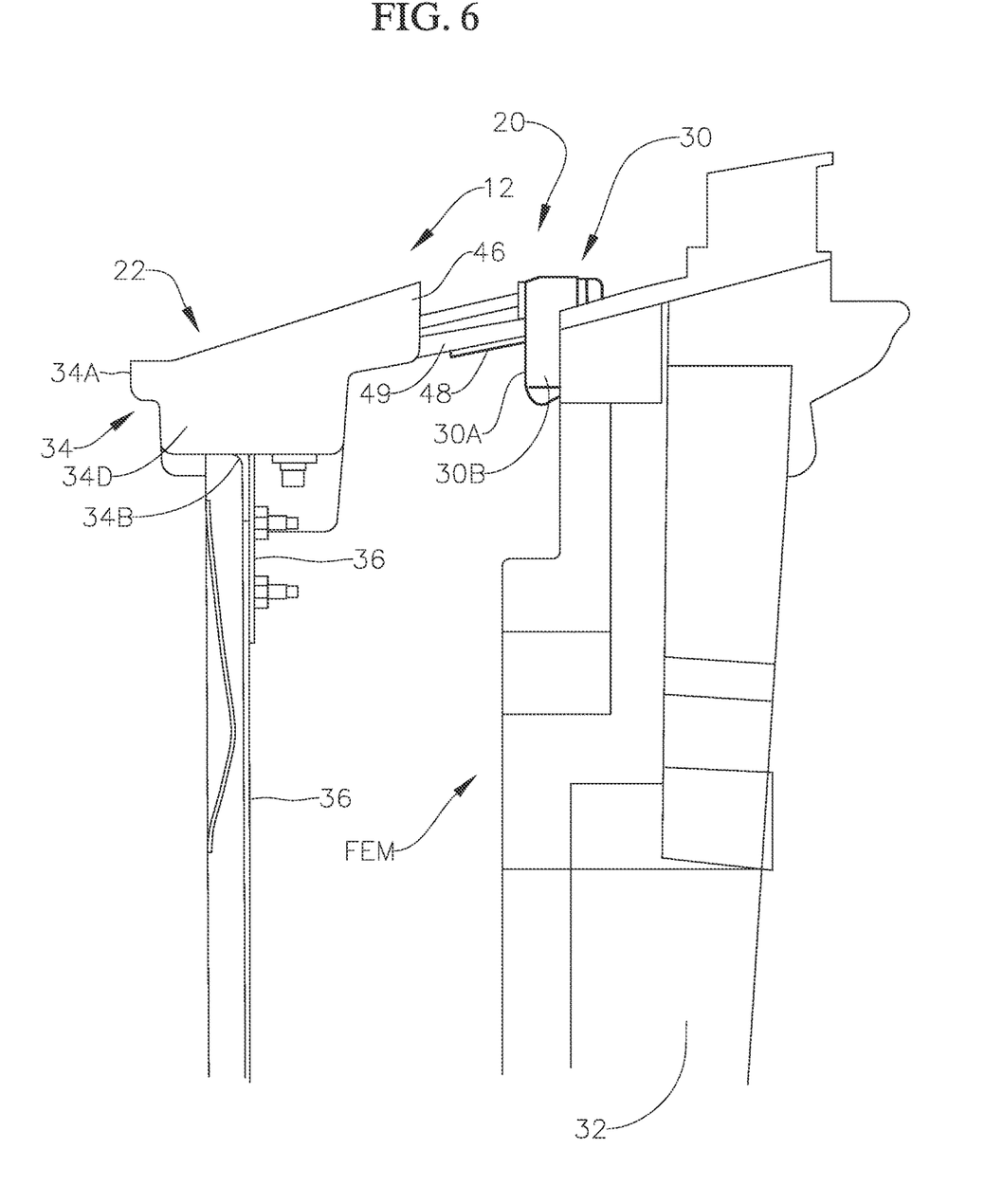
FIG. 6 is a side view of the vehicle front end assembly.

As best seen in FIG. 7, the gap barrier 48 is connected to a mounting bracket 37 that mounts the hood lock 24 to the front end assembly 12. The gap barrier 48 is connected to a mounting bracket 36. The mounting bracket 49 supports the hood lock 24. The mounting bracket 36 can also be considered a gap barrier as it extends across a gap between the hood lock assembly 20 and the bell crank assembly 22, as seen in FIG. 6.

The second airflow barrier 34 has a front wall 34A that is positioned forward of the bell crank 22A to deflect air flow received through the grille 14. The second airflow barrier 34 includes a bottom wall 34B that extends rearwardly with respect to the front wall 34A. The bottom wall 34B extends below the bell crank 22A. The bottom wall 34B can have an opening for attaching to an attachment structure (e.g., the mounting bracket 36) of the bell crank assembly 22 therethrough. Therefore, the mounting bracket 36 can be considered part of the bell crank assembly 22, or as an addition to the bell crank assembly 22.

The second airflow barrier 34 further includes a rear wall 34C positioned rearwardly with respect to the bell crank 22A and forward of the front end module FEM. The second airflow barrier 34 further includes a pair of sidewalls 34D extending from the lateral sides of the front wall 34A to the rear wall 34C. One of the sidewalls 34D includes an opening for receiving a cable of the bell crank 22A therethrough. The cable passes through the sidewall and connects the bell crank 22A to the hood lock 24. In this way, operation of the bell crank 22A operates the hood lock 24 to release the hood 18 from the closed state. Preferably, the front wall 34A and the bottom wall 34B are integrally formed. In addition, the sidewalls 34D are preferably integrally formed with the front wall 34A and the sidewalls 34D are integrally formed with the bottom wall 34B. The rear wall 34C is detachably attached to the sidewalls 34D by fasteners or by snap fit.

The bell crank 22A can be fixed to any of the front wall 34A, the rear wall 34C, the bottom wall 34B, sidewalls 34D or to the mounting bracket 36. In the illustrated embodiment, the bell crank 22A is preferably fixed to the bottom wall 34B via fasteners such as screws and/or bolts. But it will be apparent to those skilled in the vehicle field from this disclosure that the bell crank 22A can be fixed to the second airflow barrier 34 via attachment to any of the walls. The second airflow barrier 34 is installed surrounding bell crank 22A and mounting bracket 36.

Therefore, in the illustrated embodiment, the second airflow barrier 34 can be considered a bell crank housing 50 and the bell crank 22A sits within the bell crank housing 50. The bell crank housing 50 has a receptacle defined by the front wall 34A, the bottom wall 34B, the rear wall 34C and the sidewalls 34D. The bell crank 22A being movably disposed within the receptacle. Therefore, the bell crank 22A is movable with respect to the bell crank housing 50.

The bell crank housing 50 is preferably made of a rigid member, such as plastic polypropylene. As shown in FIG. 3, the bell crank assembly 22 having the bell crank 22A and the bell crank housing 50 are sized and dimensioned to be fitted to the bell crank access area 26 of the upper grille panel 16. The bell crank 22A is exposed via the top of the bell crank housing 50 so that the driver can access the bell crank 22A when the hood 18 is open.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front end assembly. Accordingly, these terms, as utilized to describe the present invention should be interpreted relative to a vehicle equipped with the vehicle front end assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end assembly comprising:
   a grille;
   a front end module having a radiator unit positioned rearwardly with respect to the grille, the front end module further having a support frame that is positioned rearwardly with respect to the radiator unit;
   an upper grille panel extending rearwardly with respect to the grille and overlying the front end module, the upper grille panel having a hood lock access area; and
   a hood lock assembly that is positioned in the hood lock access area of the upper grille panel, the hood lock assembly having a hood lock that is movable with respect to the upper grille panel, the hood lock assembly further having an airflow barrier that is fixedly supported with respect to the hood lock assembly,
   the airflow barrier having a front wall that is positioned forward of the hood lock to deflect air flow received through the grille, and
   the airflow barrier being supported to the support frame.

2. The vehicle front end assembly according to claim 1, wherein
   the hood lock is supported to the front end module at a position that is forward of the support frame.

3. The vehicle front end assembly according to claim 2, wherein
   the airflow barrier further includes a pair of sidewalls extending from the front wall rearwardly.

4. The vehicle front end assembly according to claim 3, wherein
   the sidewalls are integrally formed with the front wall.

5. The vehicle front end assembly according to claim 4, further comprising
   a bell crank assembly that is positioned in a bell crank access area of the upper grille panel, the bell crank assembly having a bell crank that is movable with respect to the upper grille panel.

6. The vehicle front end assembly according to claim 5, wherein
   the bell crank is supported to the front end module at a position that is forward of the radiator unit.

7. The vehicle front end assembly according to claim 6, wherein
   the airflow barrier further includes a mounting bracket extending forward from the front wall of the hood lock assembly towards the bell crank.

8. The vehicle front end assembly according to claim 7, wherein
the mounting bracket is a C-shaped bracket extending at an angle with respect to the front wall.

9. The vehicle front end assembly according to claim 4, wherein
the airflow barrier further includes an elastic seal, the elastic seal being disposed around a periphery of the hood lock access area.

10. The vehicle front end assembly according to claim 4, further comprising
a hood overlying the upper grille panel, the elastic seal being positioned between the upper grille panel and the hood.

11. The vehicle front end assembly according to claim 10, wherein
the hood lock is supported to the support frame.

12. A hood lock assembly for a vehicle, comprising:
a hood lock;
a support frame; and
a hood lock housing, the hood lock being movable with respect to the hood lock housing, the hood lock housing having a receptacle defined by a front wall and a pair of sidewalls, the hood lock being movably disposed within the receptacle,
the hood lock and the hood lock housing being supported to the support frame.

13. A vehicle front end assembly comprising:
a grille;
a front end module having a radiator unit positioned rearwardly with respect to the grille, the front end module further having a support frame that is positioned rearwardly with respect to the radiator unit;
an upper grille panel extending rearwardly with respect to the grille and overlying the front end module, the upper grille panel having a hood lock access area and a bell crank access area;
a hood lock assembly that is positioned in the hood lock access area of the upper grille panel, the hood lock assembly having a hood lock that is movable with respect to the upper grille panel, the hood lock assembly further having a first airflow barrier that is fixedly supported with respect to the hood lock assembly; and
a bell crank assembly that is positioned in the bell crank access area of the upper grille panel, the bell crank assembly having a bell crank that is movable with respect to the upper grille panel, the bell crank assembly further having a second airflow barrier that is fixedly supported with respect to the bell crank assembly.

14. The vehicle front end assembly according to claim 13, wherein
the first airflow barrier has a front wall that is positioned forward of the hood lock to deflect air flow received through the grille.

15. The vehicle front end assembly according to claim 14, wherein
the hood lock is supported to the front end module at a position that is forward of the support frame.

16. The vehicle front end assembly according to claim 15, wherein
the bell crank is supported to the front end module at a position that is forward of the radiator unit.

17. The vehicle front end assembly according to claim 16, wherein
the second airflow barrier being positioned forward of the bell crank.

* * * * *